Aug. 10, 1937.  M. WEBER  2,089,634
RAIL JOINT
Filed Oct. 25, 1935  2 Sheets-Sheet 1
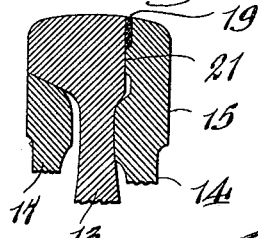
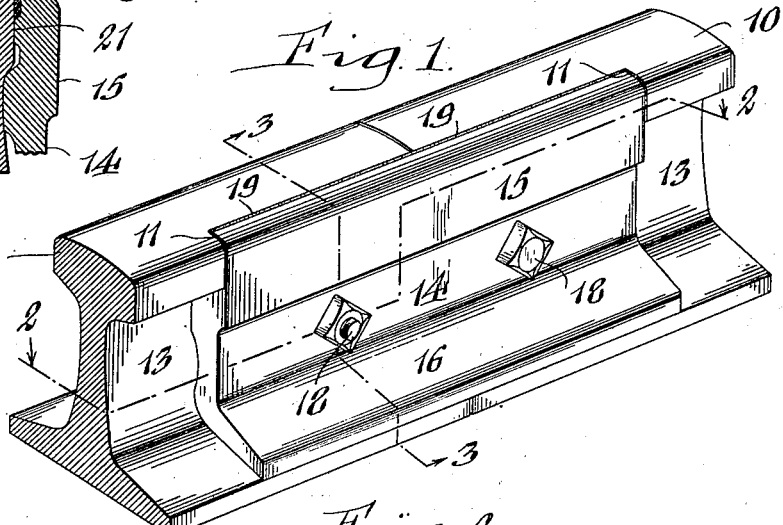
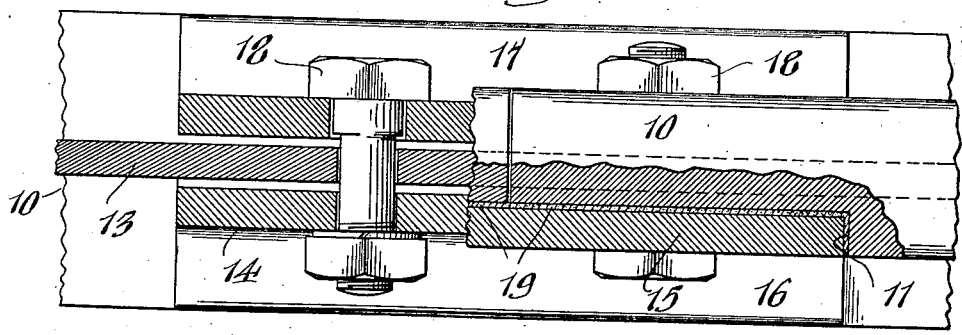
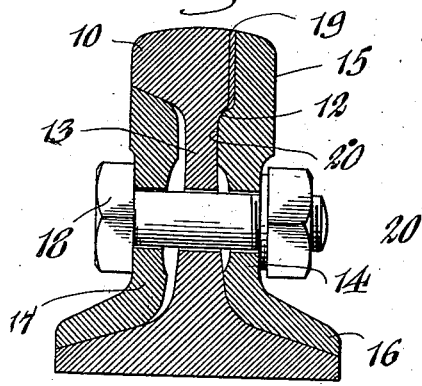
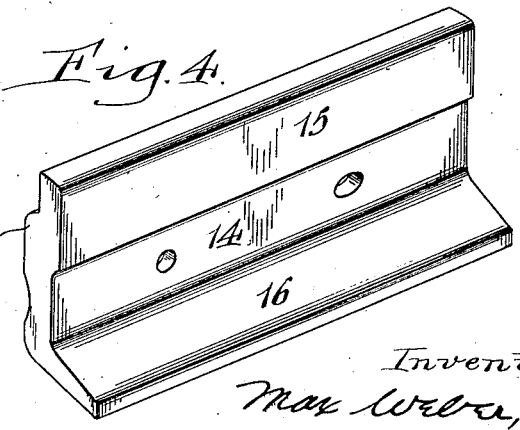
Inventor,
Max Weber,
by Walter P. Guyer
Attorney.

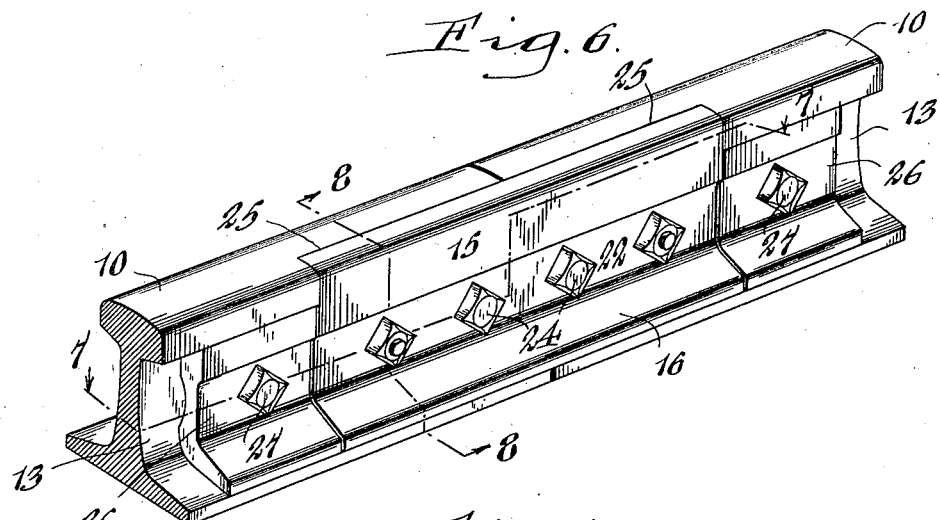
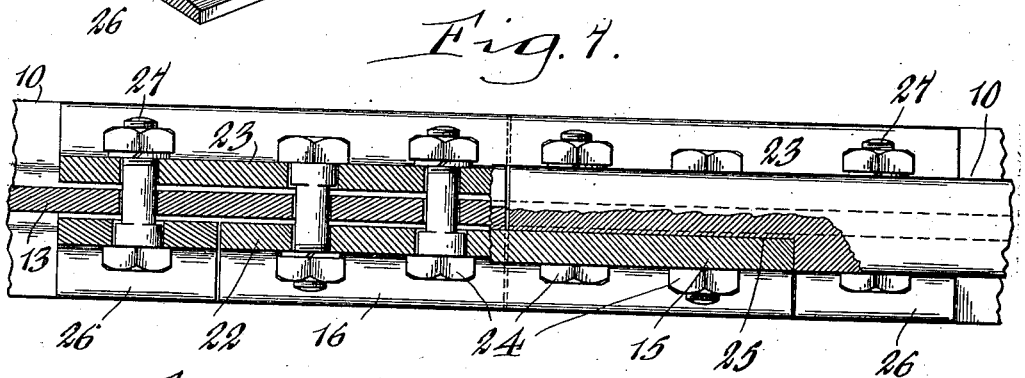
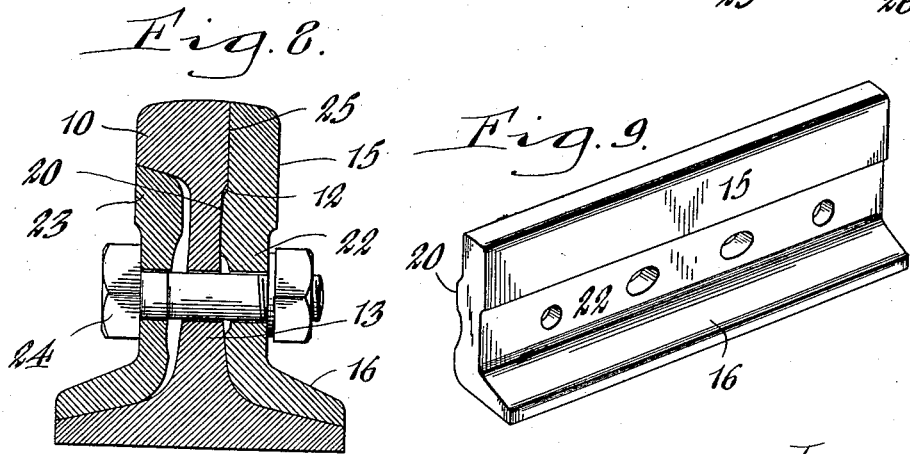
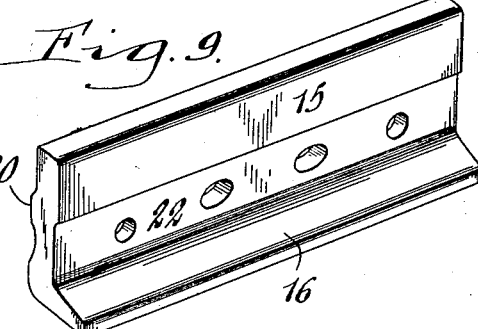

Patented Aug. 10, 1937

2,089,634

UNITED STATES PATENT OFFICE 2,089,634

RAIL JOINT

Max Weber, Buffalo, N. Y.

Application October 25, 1935, Serial No. 46,745

2 Claims. (Cl. 238—221)

This invention relates generally to improvements in railroad equipment but more particularly to rail joints.

It has for its primary object to provide a rail joint which is not only strong, sturdy and durable in construction, but which is so designed as to effectually and positively maintain the abutting rail-ends in alinement and at the same level at all times, and which eliminates low or drooping joints and the resulting pounding and jarring of the train wheels over the rails, as well as reducing to a minimum the wear on the track lines and rolling equipment.

Another object of the invention is the provision of a rail joint which is constructed for ready assemblage, which is simple and inexpensive in construction, and which prevents the abutting rail-ends getting into a drooping or out of level position.

A further object is to provide a novel rail joint structure wherein one of the joint elements constitutes a portion of the rail-head and serves as a splice bar for the abutting ends of the rails.

Other features of the invention reside in the construction and arrangement of parts hereinafter described and particularly pointed out in the appended claims.

In the accompanying drawings:—

Figure 1 is a perspective view of the rail joint embodying my invention. Figure 2 is a horizontal section thereof taken substantially in the plane of line 2—2, Figure 1. Figure 3 is a cross section taken on line 3—3, Figure 1. Figure 4 is a detached perspective view of the main joint or splice bar. Figure 5 is a cross section of a slight modification of the joint. Figure 6 is a perspective of a modified construction of the joint. Figure 7 is a horizontal section taken substantially in the plane of line 7—7, Figure 6. Figure 8 is a cross section taken on line 8—8, Figure 6. Figure 9 is a detached perspective view of the main joint or splice bar of this modification.

Similar characters of reference indicate corresponding parts throughout the several views.

Referring now to the preferred embodiment of my invention shown in Figures 1–4, inclusive, the numerals 10, 10 indicate the adjoining or abutting ends of a railroad rail. My joint is so designed and constructed as to effectually maintain the abutting rail-ends at the same level as well as to provide a joint wherein one of the joint members bridges the rail joint at the inner and adjoining top side of the rail-head and functions not only as a splice bar for connecting the adjoining ends of the rail but also constitutes a portion of the rail-head and bridges or spans the abutting ends of the rail to form a continuation of the rail-head along the jointed structure.

For this purpose, the inner or gage line sides of the abutting end portions of the rail-heads are removed in the manner shown in Figures 1 and 2 to provide longitudinal alining scarf-like or rabbet joints or recesses 11, these recesses being preferably formed by burning off the head portions of the rail, the depth or transverse dimensions of the recesses terminating at a point short of the fillet 12 between the heads of the rails 10 and the adjoining upper portions of the rail-web 13, as seen in Figure 3. The numeral 14 indicates the main joint member or splice bar 15 which has a cross section approximately the same as half the section of a railroad rail and its head portion 15 spans or bridges the abutting ends of the rails 10 and occupies the recesses 11 to provide the abutting rail-heads with a continuous wheel-engaging portion spanning or bridging the jointed ends of the rails. This splice bar is preferably welded in place and extends a suitable distance on either side of the point or juncture of the rail-ends and abuts at its inner side or face against the opposing face of the rail-web 13, the lower end of the bar terminating in a base flange 16 which fits snugly against the rail-bases, as shown in Figure 3. It will also be noted in Figures 1 and 3 that the head 15 of the splice bar is flush with the top and inner sides of the rail-ends 10 and for strengthening purposes this head extends somewhat below the rail-heads.

Applied to the opposite side of the abutting ends of the rails 10, is a clamping bar 17 of substantially angular shape whose top edge underlies and firmly abuts the underside of the rail-head and whose lower end overlies and snugly engages the base of the rail. Clamping bolts 18 are provided for securely fastening the splice bar 14 and the clamping bar 17 to the rails. In addition to the clamping bolts, the splice bar is firmly anchored to the abutting ends of the rails through the medium of a weld 19. The metal constituting the weld is arranged in the seam or space between the rail-head recesses 11 and the splice bar head 15, as shown in Figures 1 and 2. The splice bar 14, as seen in Figures 3 and 4, has a projection 20 at its inner side which extends lengthwise thereof and fits snugly against the adjoining side of the rail-web 13 and fillet 12, thereby forming a closure for the gap or space between the rail-head and splice bar head and preventing the weld flowing out between these parts during the welding operation.

If desired, the amount of weld used between the splice bar and the rail-head may be reduced by providing the head portion 15 of the splice bar with a rib 21, shown in Figure 5, which serves to reduce the height of the space between this bar and the rail-head, so that a lesser amount of weld is required to fill the space between these parts.

In the modified form of joint shown in Figures 6-9, inclusive, the use of a welded joint is dispensed with. In this form of the invention, which provides fo rexpansion, the splice bar is the same in construction as that previously described and is indicated generally by the numeral 22, this bar being somewhat longer than the bar used in the previously described construction. At the opposite side of the notched or recessed ends of the rails, there is provided a clamping bar 23 which is somewhat longer than the bar 22 and clamping bolts 24 are provided for securely fastening these bars to the web of the rail. As stated, the clamping bar 23 is longer than the splice bar 22 and projects longitudinally a suitable distance beyond the opposite side of the rails containing the splice bar head-receiving recesses 25. On the splice bar side of the rails and adjoining the ends of the splice bar, are angular-shaped extension bars 26 which are connected by bolts 27 with the opposing end portions of the clamping bar 23.

My improved rail joint, while particularly intended for use on new rails, is likewise applicable in reconstructing old rails which have become worn at the joints, and effectually serves to keep the abutting rails even and level at all times and prevents their drooping at the joint. In making a track line with my invention, the welded type of joint shown in Figures 1-5, inclusive, may be used for the most part with an occasional expansion type of joint shown in Figures 6-9, inclusive, inserted at desired intervals.

I claim as my invention:—

1. In a rail joint for T-head railroad rails, the combination of abutting rail-sections having longitudinally-alined recesses in the inner wheel-flange engaging side of the heads thereof and extending vertically from the tread-faces to the bottom faces thereof and transversely to a point short of the rail-webs, and a joint member spanning the joint line between the rail-sections and having a head fitted in said recesses and forming a continuation of the rail-heads, said joint member being welded to the rail-heads along the walls of said recesses to provide a continuous tread surface and having a longitudinal projection at its inner side abutting the adjoining side of the rail to form a closure for preventing the weld flowing out between the rail-head and joint member.

2. In a rail joint for T-head railroad rails, the combination of abutting rail-sections having longitudinally-alined recesses in the inner wheel-flange engaging side of the heads thereof and extending vertically from the tread-faces to the bottom faces thereof and transversely to a point short of the rail-webs, a splice bar spanning the joint line between the rail-sections and having a head fitted in said recesses and forming a continuation of the rail-heads, a web portion engaging the rail-web, and a base portion overlying the rail-base, the splice bar having a longitudinal projection at its inner side abutting the adjoining side of the rail and the joint space between the rail-head and splice bar being filled with weld, said projection forming a closure to arrest the flow of the weld, and a clamping plate applied to the opposite side of the rail-sections for securely fastening the joint member to said sections.

MAX WEBER.